(12) United States Patent
Kawase (10) Patent No.: US 6,859,296 B2
(45) Date of Patent: Feb. 22, 2005

(54) ELECTRO-OPTICAL DEVICE, METHOD OF MANUFACTURING THE SAME, AND ELECTRONIC APPARATUS

(75) Inventor: Tomomi Kawase, Suwa (JP)

(73) Assignee: Seiko Epson Corporation (JP)

( * ) Notice: Subject to any disclaimer, the term of this patent is extended or adjusted under 35 U.S.C. 154(b) by 40 days.

(21) Appl. No.: 10/281,878

(22) Filed: Oct. 28, 2002

(65) Prior Publication Data

US 2003/0103017 A1 Jun. 5, 2003

(30) Foreign Application Priority Data

Nov. 7, 2001 (JP) ........................................ 2001-342451

(51) Int. Cl.[7] .............................. G02F 1/00; G02F 1/03; G02F 1/1335
(52) U.S. Cl. ........................ 359/237; 359/245; 359/248; 359/247; 349/96
(58) Field of Search ................................. 359/237, 245, 359/248, 247, 246; 349/96, 106, 112

(56) References Cited

U.S. PATENT DOCUMENTS 6,597,339 B1 * 7/2003 Ogawa ........................ 345/102

2001/0020990 A1 * 9/2001 Moon ........................... 349/96

FOREIGN PATENT DOCUMENTS

| JP | 2000-321564 | 11/2000 |
|---|---|---|
| JP | 2000-267081 | 9/2001 |

* cited by examiner

Primary Examiner—Georgia Epps
Assistant Examiner—Timothy Thompson
(74) Attorney, Agent, or Firm—Harness, Dickey & Pierce, P.L.C.

(57) ABSTRACT

An electro-optical device 101 is provided with an electro-optical panel 102 in which a liquid crystal material L is held between a pair of opposed electrodes 114a and 114b, and a dot is formed in each of regions where the pair of opposed electrodes 114a and 114b is opposed to each other, and with a light source 106 for irradiating the electro-optical panel 102 with light. The device further comprises a transflective film 112 having a light-transmitting region 113 provided for each of the dots to transmit light from the light source 106 and a light-reflecting region for reflecting the external light, a colored layer 118 provided corresponding to the dots, and a colored layer 121 provided opposite to the colored layer 118 with the liquid crystal material L held therebetween corresponding to the light-transmitting region 113.

12 Claims, 10 Drawing Sheets

FIG. 11 ically freely set. For example,
ELECTRO-OPTICAL DEVICE, METHOD OF MANUFACTURING THE SAME, AND ELECTRONIC APPARATUS

BACKGROUND OF THE INVENTION

1. Technical Field of the Invention

The present invention relates to an electro-optical device and a method of manufacturing the same, and an electronic apparatus. More specifically, the present invention relates to an electro-optical device which is suitably used as a transflective electro-optical device in an electronic apparatus such as a cellular phone, a portable personal computer, or the like, and which is capable of improving the color density and color purity of a transmissive image display without deteriorating the brightness of a reflective image display, a method of manufacturing the electro-optical device, and an electronic apparatus.

2. Description of the Related Art

In recent years, electro-optical devices have been widely used as display sections of electronic apparatus such as a cellular phone, a portable personal computer, etc. The electro-optical devices have taken various forms according to the desired purposes. For example, when the device is used in a dark place or the luminance of an image display section is particularly required, a transmissive electro-optical device which uses, for displaying, light incident from a light source at the back of the electro-optical device is used, while when the device is used in a sufficiently bright place or the luminance of an image display section is not particularly required, a reflective device which uses, for displaying, external light such as natural light or room light incident from the front of the device to be reflected is used.

Furthermore, a so-called transflective electro-optical device capable of both transmissive display and reflective display can also be used. The transflective electro-optical device comprises a colored layer to permit a full-color display, and is capable of suppressing power consumption by turning on and off a light source according to operation conditions, and thus the transflective electro-optical device is useful as a full-color electro-optical device of a portable electronic apparatus using a charging battery or the like as an electric power supply.

However, such a transflective electro-optical device uses two different display systems and thus has the following problem.

When the transflective electro-optical device is used as a reflective type, external light incident from the front of the image display section passes through a colored layer, and is then reflected by a transflective film, and again passes through the colored layer. Therefore, the distance of passage through the colored layer is two times or more that with transmissive type in which light passes through the colored layer only one time, thereby decreasing the brightness of a display image. In order to achieve a sufficiently bright image display when the device is used as the reflective type, it is necessary to decrease the thickness of the colored layer or the pigment concentration. However, in use as the transmissive type under this condition, an image display with a sufficient color tone (color density) and color purity cannot be obtained. Conversely, when the condition of the colored layer is set by increasing the thickness of the colored layer or the pigment concentration to obtain a transmissive image display with a sufficient color density, a reflective image display with sufficient brightness cannot be obtained. Therefore, the achievement of a reflective image display with sufficient color brightness and the achievement of a transmissive display with a sufficient color density (color concentration) and color purity is difficult to obtain.

The "color purity" can be defined by the content of a specified wavelength in the wavelengths of light transmitted through the colored layer. For example, the color purity can be represented by the half-width of a peak wavelength in a transmittance curve drawn in a graph showing transmittance on the Y axis, and wavelength on the X axis. Namely, the color purity increases as the half-width decreases.

An object of the present invention is to provide an electro-optical device which is suitably used as a transflective electro-optical device in an electronic apparatus such as a cellular phone, a portable personal computer, or the like, and which is capable of improving the color density and color purity of a transmissive image display without deteriorating the brightness of a reflective image display, and a method of manufacturing the electro-optical device, and an electronic apparatus.

SUMMARY OF THE INVENTION

An electro-optical device of the present invention is provided with an electro-optical panel in which an electro-optical material is held between a pair of electrodes, and a dot is formed in each of regions where the pair of electrodes opposes each other, and provided with a light source for irradiating the electro-optical panel with light. The electro-optical device is also capable of a reflective display using external light and a transmissive display using light from the light source. The electro-optical device further comprises a transflective film comprising a light-transmitting region provided for each of the dots to transmit light from the light source and a light-reflecting region for reflecting the external light, a first colored layer provided corresponding to the dots, and a second colored layer provided opposite to the first colored layer with the electro-optical material held therebetween corresponding to the light-transmitting regions.

In this construction, light from the light source passes through both the first colored layer provided in correspondence to the dots, and the second colored layer provided in correspondence to the light-transmitting region of the transflective film, and thus a transmissive display with high color purity can be achieved. On the other hand, the external light passes through the first colored layer provided in correspondence to the dots two times in forward and backward travels to permit a reflective bright display with high color purity without causing excessive light absorption by the second colored layer.

In this case, the first and second colored layers corresponding to each of the dots preferably have similar colors. Furthermore, when the first colored layer and the second colored layer contain substantially the same material, the first colored layer and the second colored layer can be produced in the same manufacturing line, thereby yielding an advantage of manufacturing cost.

On the other hand, even when the first colored layer and the second colored layer are formed by using different materials, there is the advantage that the characteristics of each colored layer can be relatively freely set. For example, the color purity, the color density, transmittance, or the like of each of the first colored layer and the second colored layer can be appropriately changed to realize a desired display color according to purposes.

The electro-optical device further comprises a pixel defined by a plurality of dots, and the dots in the pixel generally differ in colors of the first and second colored layers.

For example, one pixel comprises three dots respectively corresponding to colored layers of the additive primary colors, i.e., red, blue and green. Alternatively, one pixel comprises three dots respectively corresponding to colored layers of the subtractive primary colors, i.e., cyan, magenta and yellow, to permit both a full-color transmissive display and a reflective display.

Furthermore, a transparent electrode of ITO (Indium Tin oxide) or the like is used as each of the electrodes. Of the transparent electrodes, the transparent electrode disposed on the transflective film side is preferably laminated on the transflective film directly or with a transparent insulating film provided therebetween.

This is because when the transflective film also serves as an electrode, a sufficient voltage cannot be applied to the electro-optical material in the light-transmitting region.

Conceivable examples of the construction of the electro-optical device of the present invention include a construction in which the first colored layer is provided on the transflective film side, and the second colored layer is provided opposite to the transflective film side with an electro-optical layer provided therebetween, and a construction in which the second colored layer is provided on the transflective film side, and the first colored layer is provided opposite to the transflective film side with an electro-optical layer provided therebetween.

In the latter case, the second colored layer is formed on a substrate on which the transflective film is provided, in correspondence to the light-transmitting region. Therefore, in bonding together two substrates constituting the electro-optical device, the fine work of precisely aligning the light-transmitting region with the second colored layer is not required, and thus the effect of improving manufacturing yield can be expected.

Although the ratios of the light-reflecting portion and the light-transmitting portion to the dot area can be arbitrarily set according to purposes of the electro-optical devices, the ratio of the light-transmitting portion to the dot area is set to about not less than 10% to not more than 80%.

The first colored layer is formed to cover the entire dot area or 80% or more of the dot area, and the second colored layer is formed at a ratio of about not less than 25% to not more than 150% of the area of the light-transmitting portion.

DESCRIPTION OF THE PREFERRED EMBODIMENTS

An electro-optical device and a method of manufacturing the same according to an embodiment of the present invention are described in detail below with reference to the drawings. The embodiment represents just one mode of the present invention, and the present invention is not limited to the embodiment. The embodiment can be changed within the scope of the present invention.

Figure 1:
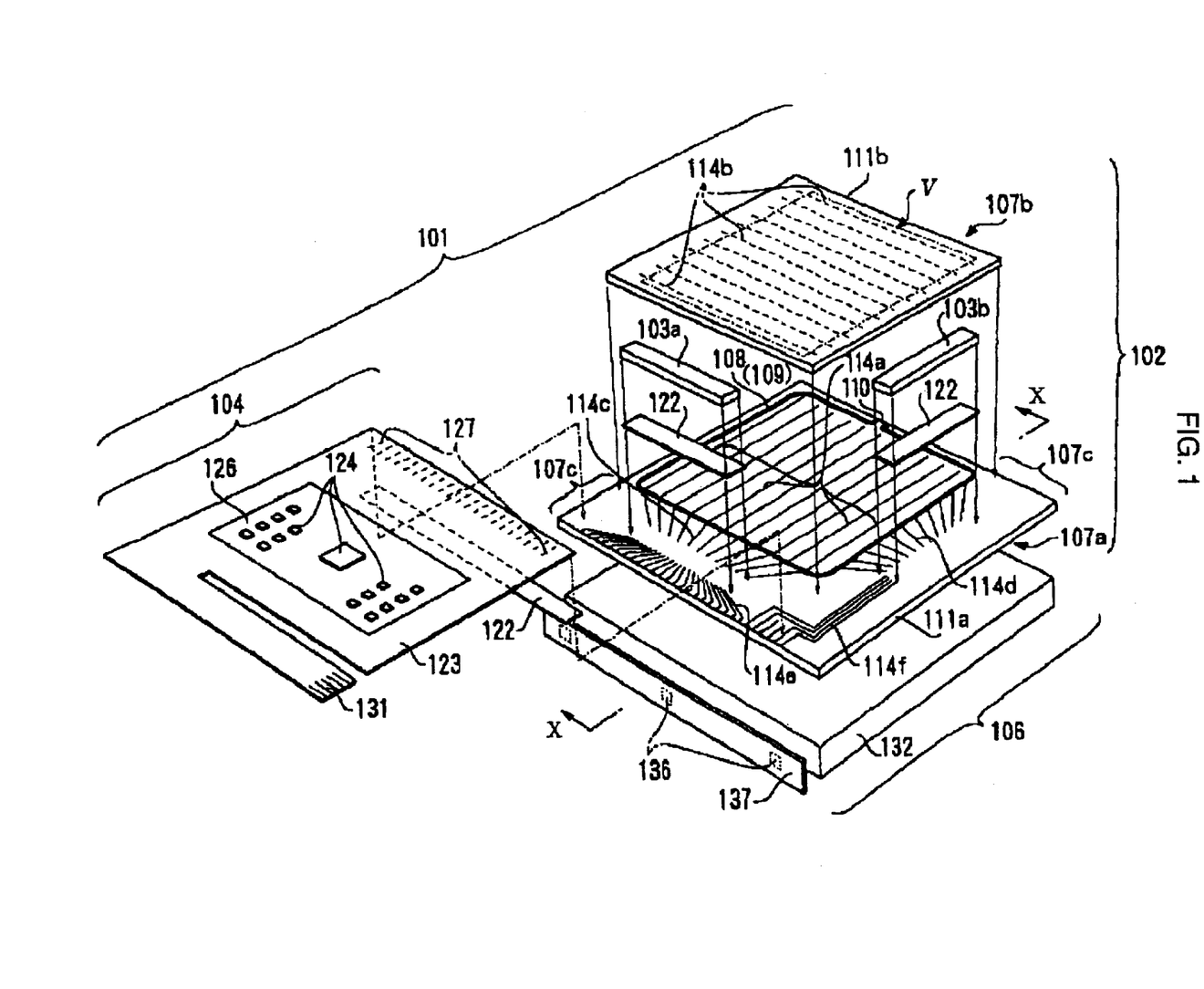
FIG. 1 is an exploded perspective view schematically showing an electro-optical device according to an embodiment of the present invention.
Figure 2:
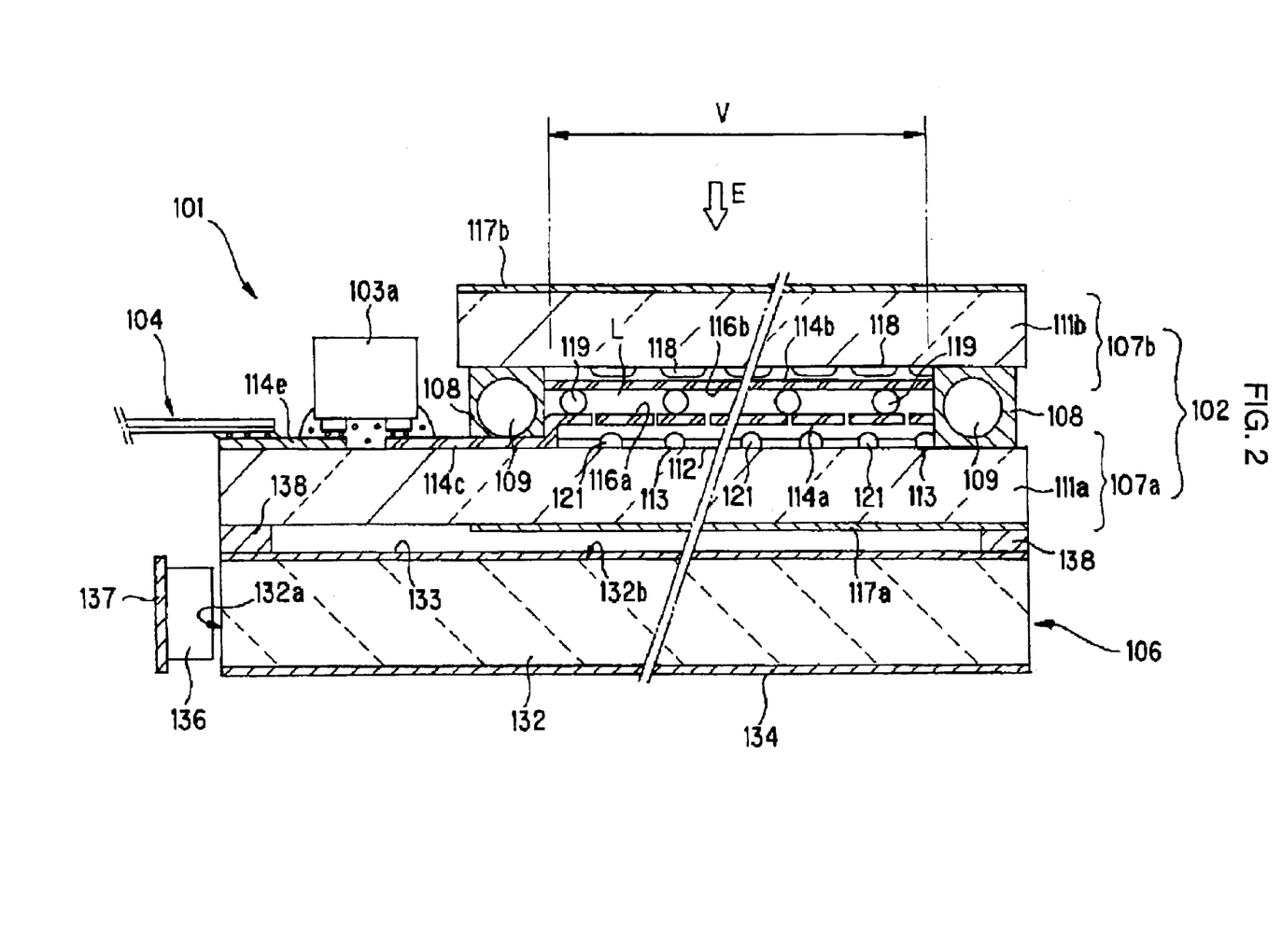
FIG. 2 is a sectional view taken along line X—X in FIG. 1.

FIG. 1 is an exploded perspective view schematically showing an electro-optical device according to an embodiment of the present invention, and FIG. 2 is a sectional view taken along line X—X in FIG. 1. The electro-optical device shown in FIGS. 1 and 2 is a transflective electro-optical device which performs a full-color display in a passive matrix system.

As shown in FIG. 1, an electro-optical device (liquid crystal device) 101 comprises an electro-optical panel (liquid crystal panel) 102 on which semiconductor chips (liquid crystal driving ICs) 103*a* and 103*b* are mounted, a wiring connecting element (flexible printed circuit board (FPC)) 104 connected to the liquid crystal panel 102, and a light source 106 provided as a back light at the back of the liquid crystal panel 102.

The liquid crystal panel 102 is formed by bonding together substrates 107*a* and 107*b* with a sealing material 108.

Figure 3:
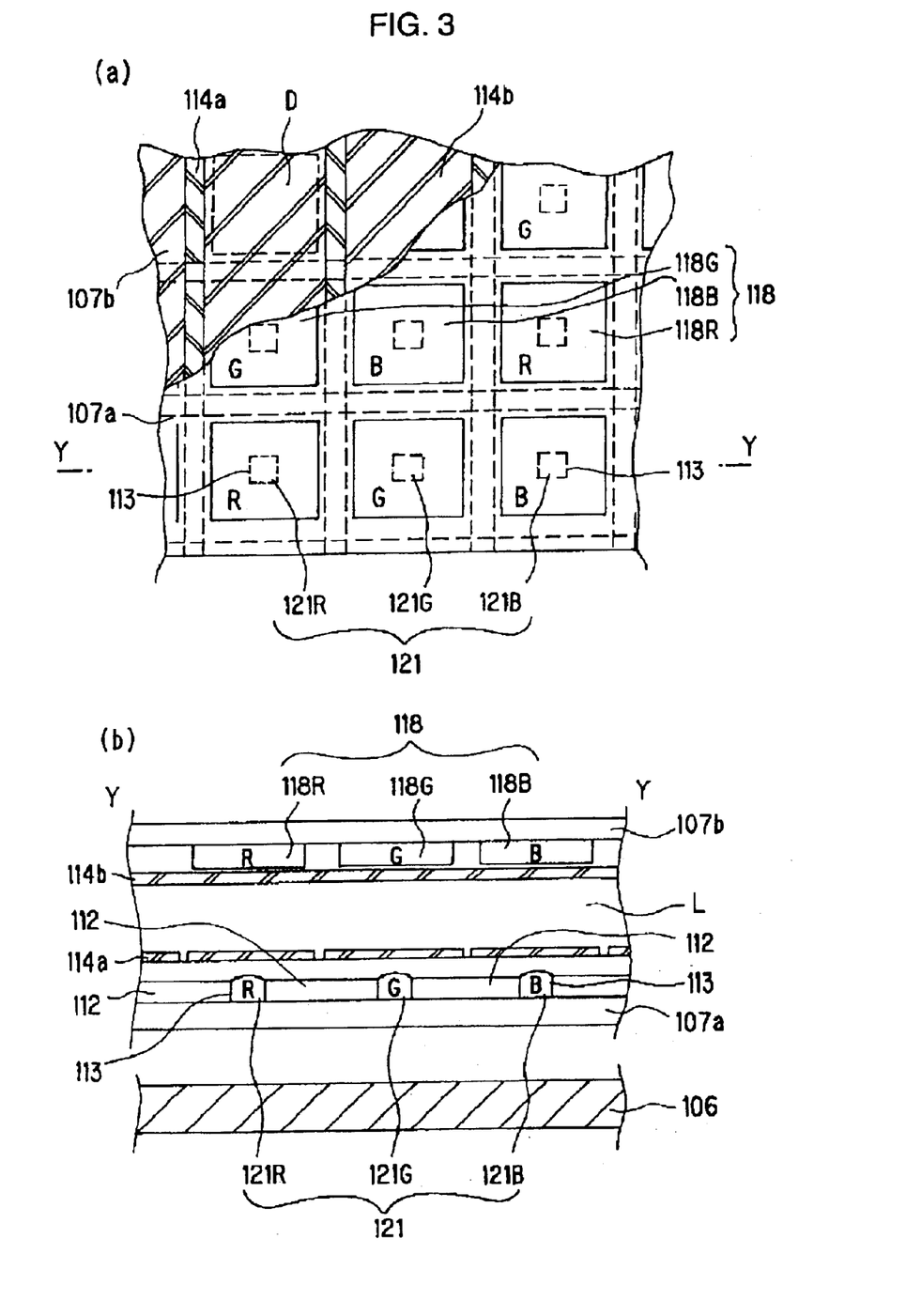
FIG. 3 is a drawing schematically illustrating a liquid crystal panel used in an electro-optical device according to an embodiment of the present invention, in which FIG. 3(*a*) is a plan view, and FIG. 3(*b*) is a sectional view.

FIG. 3 is a drawing schematically illustrating a liquid crystal panel used in an electro-optical device according to an embodiment of the present invention, in which FIG. 3(*a*) is a plan view, and FIG. 3(*b*) is a sectional view taken along line Y—Y in FIG. 3(*a*). As shown in FIG. 3, the substrates 107*a* and 107*b* constituting the liquid crystal panel 102 (refer to FIG. 1) are arranged opposite to each other with a liquid crystal material L as an electro-optical material held therebetween. Furthermore, the substrate 107*a* comprises a transflective film 112 provided on the liquid crystal material L side as the electro-optical material, for reflecting light incident from the substrate 107*b*.

The transflective film 112 comprises, for example, a light reflecting material such as aluminum, silver, an alloy containing at least one of aluminum and silver, or laminated films of aluminum or silver, and titanium, titanium nitride, molybdenum, tantalum, or the like.

Furthermore, a pair of electrodes 114*a* and 114*b* is formed on the substrates 107*a* and 107*b*, respectively, by using ITO, for applying a voltage to the liquid crystal material L. A dot D is formed as a drive unit for the liquid crystal material L for each of the intersections of the electrodes 114a and 114b.

As shown in FIG. 3(b), the transflective film 112 has a light-transmitting region 113 formed for each of the dots D to transmit light from the light source 106 disposed at the back, and a colored layer 121 is formed to fill in the light-transmitting regions 113. The dots D are in the form of an array or matrix and are located in those areas in the material L where the electrodes 114a, 114b overlap or intersect. The colored layer has an array of colored segments which are located in the light transmitting regions 113 of transflective film 112. In this case, the area of the segments of colored layer 121 is preferably 25 to 150% of the area of the light-transmitting regions 113 of the transflective film 112. In FIG. 3(b), the ratio is 100%.

The colored layer 121 includes a plurality of colored segments or layers 121R, 121G and 121B having different colors, i.e., red (R), green (G), and blue (B), respectively, and three dots corresponding to these three colors form one pixel.

As shown in FIG. 3(b), a colored layer 118 is formed in a region on the substrate 107b, which corresponds to the colored layer 121. The colored layer 118 comprises a plurality of colored layers or segments 118R, 118G and 118B having different colors. The colored layer 121 and the colored layer 118 are formed so that the opposed regions (vertically aligned segments) are the same color. As a material for the colored layer 121 and the colored layer 118, for example, a photosensitive resin such as an acryl resin or the like can be used.

Although, in this embodiment, the colored layer 118 is formed to cover the entire region of dots D, the colored layer 118 need not to cover the entire region, and the design of the colored layer 118 can be changed so as to cover, for example, not less than 80% to not more than 100% of the region of dots D.

Although, in FIG. 3, red (R), green (G) and blue (B) are shown as examples of the colors of the segments of colored layer 121 and the colored layer 118, the colors are not limited to these colors. For example, a combination of cyan, magenta and yellow may be used.

Figure 4:
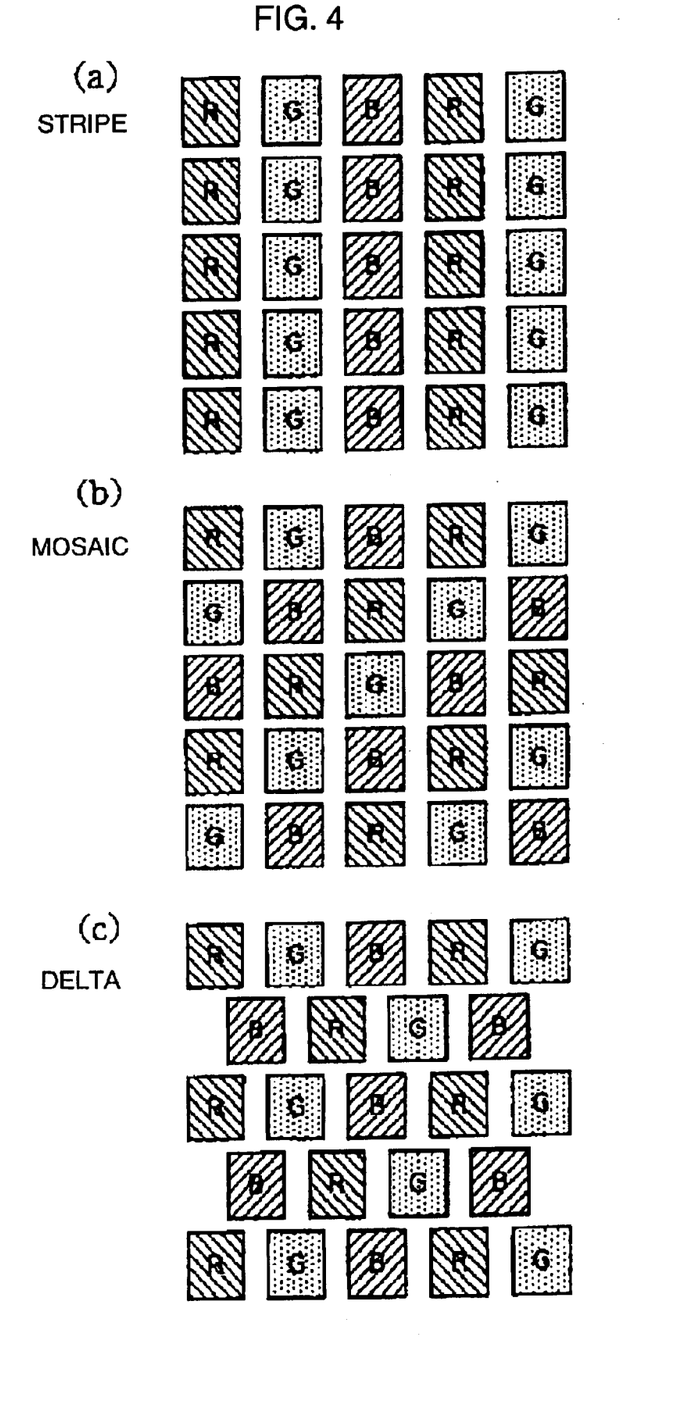
FIG. 4 is a plan view showing examples of the arrangement of pixels comprising color dots of the three colors, red (R), green (G), and blue (B), in an electro-optical device.

Examples of the array patterns of the plurality of colored layers 121R, 121G and 121B constituting the colored layer 121, and the colored layers 118R, 118G and 118B constituting the colored layer 118 include a stripe pattern, a delta pattern, a mosaic pattern, and the like, as shown in FIG. 4.

Figure 5:
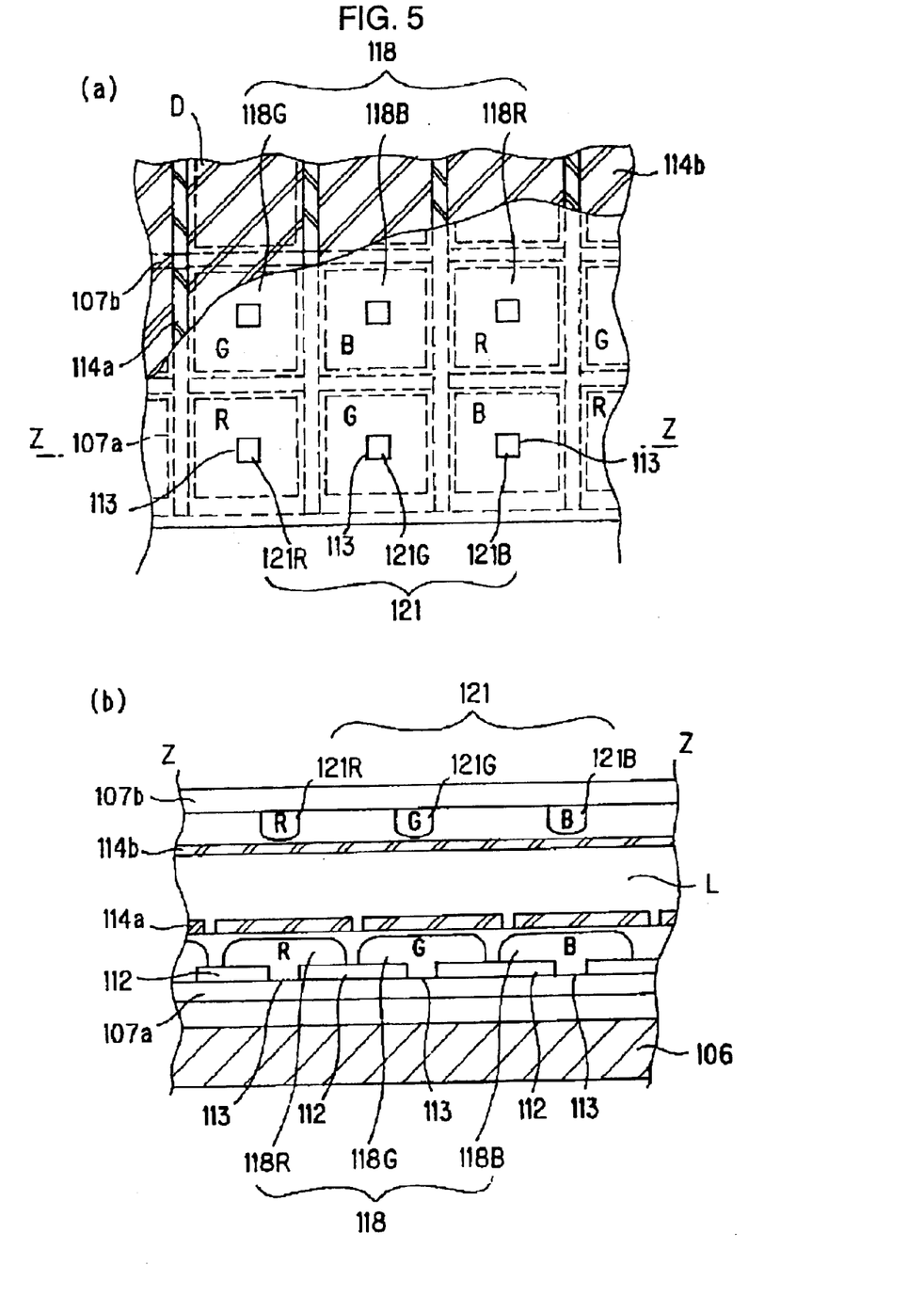
FIG. 5 is a drawing schematically illustrating a liquid crystal panel used in an electro-optical device according to another embodiment of the present invention, in which FIG. 5(*a*) is a plan view, and FIG. 5(*b*) is a sectional view.

FIG. 5 is a drawing schematically illustrating a liquid crystal panel used for an electro-optical device according to another embodiment of the present invention. FIG. 5(a) is a plan view, and FIG. 5(b) is a sectional view taken along line Z—Z in FIG. 5(a). The reference numerals are the same as the embodiment show in FIG. 3.

This embodiment is different from the above embodiment in that the colored layer 121 is formed on the substrate 107b in correspondence to the light-transmitting regions 113 of the transflective film 112, and the colored layer 118 is formed on the substrate 107a in correspondence to the dots D. The other members are the same as the embodiment shown in FIG. 3.

As shown in FIG. 5(b), the transflective film 112 has the light-transmitting region 113 formed for each of the dots D to transmit light from the light source 106 disposed at the back, and the colored layer 118 is formed to cover the light-transmitting regions 113. In this case, the colored layer 118 is formed to cover the entire region of the dots D, but the colored layer 118 need not to cover the entire region of the dots D. For example, the design of the colored layer 118 can be changed to cover not less than 80% to not more than 100% of the region of the dots D.

Also, the colored layer 121 is formed on the substrate 107b in correspondence to the light-transmitting regions 113. In this case, the colored layer 121 is preferably formed so that the area of the colored layer 121 formed is 25 to 150% of the area of the light-transmitting regions 113 of the transflective film 112. In FIG. 5(b), the ratio of the colored layer 121 formed is 100% of the light-transmitting regions 113.

Figure 6:
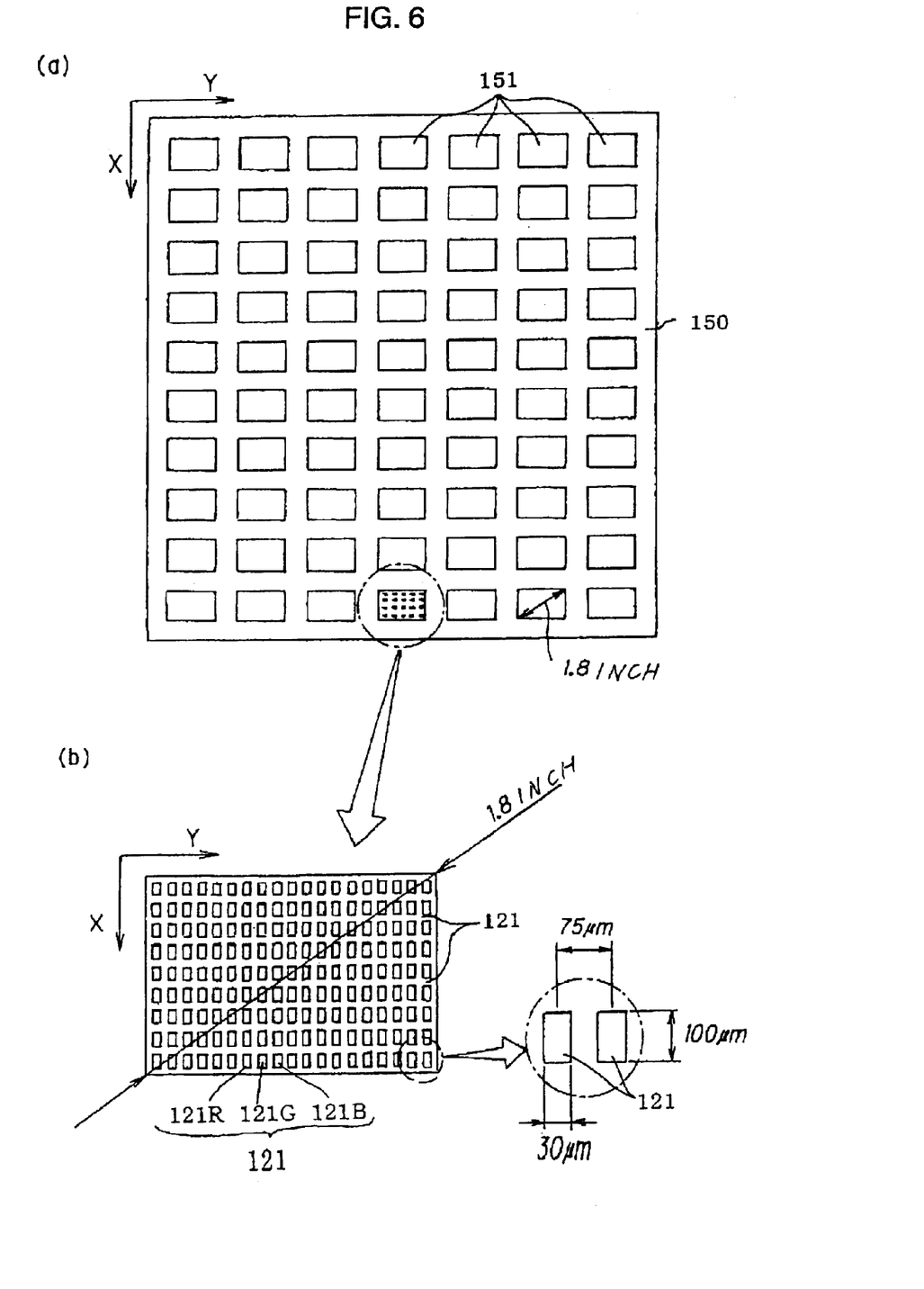
FIG. 6 is a plan view schematically showing the construction of a substrate used in an electro-optical device of the present invention, in which FIG. 6(*a*) shows the whole of a mother board before it is cut into substrates, and FIG. 6(*b*) is a partial enlarged view showing one of the substrates after cutting of the mother board shown in FIG. 6(*a*).

FIG. 6 is a plan view schematically showing the construction of a substrate used for an electro-optical device of the present invention. FIG. 6(a) shows the whole mother board before it is cut into respective substrates, and FIG. 6(b) is a partial enlarged view of one of the substrates after the mother board shown in FIG. 6(a) is cut. As shown in FIG. 6(b), the substrates 107a and 107b have a size of, for example, 1.8 inches in diagonal dimension. Each of the dots has a size of, for example, 30 $\mu$m×100 $\mu$m. The distance between the dots 121R, 121G and 121B, i.e., the so-called element pitch, is, for example, 75 $\mu$m. In FIG. 6(b), the colored layers are shown as 121R, 121G and 121B in the same size and shape as the dots.

When the electro-optical device of the present invention is used as a full-color display device, the colored layers 121R, 121G and 121B having the three colors of red (R), green (G) and blue (B) are combined into a unit to form one pixel, and light is selectively reflected from or transmitted through any one of the red (R), green (G) and blue (B) or a combination thereof in one pixel to permit a full-color display.

As shown in FIG. 2, the substrate 107a comprises a plate-shaped base material 111a made of transparent glass or plastic, or the like. The transflective film 112 is formed on the inner surface (the upper surface in FIG. 2) of the base material 111a, and the colored layer 121 is formed to cover the apertures 113 of the transflective film 112. Furthermore, an insulating film is formed on the colored layer 121, and the electrodes 114a are formed in stripes (refer to FIG. 1) on the insulating film, as viewed from the direction of an arrow E. Furthermore, an alignment film 116a is formed on the electrodes 114a.

In FIG. 1, in order to make the arrangement of the electrodes 114a easy to see, the stripes are shown with a wider space than an actual space, and thus the number of the electrodes shown in FIG. 1 is smaller than an actual number. However, actually, a larger number of electrodes 114a are formed on the base material 111a.

As shown in FIG. 2, the substrate 107b comprises a plate-shaped base material 111b made of transparent glass or plastic. The colored layer 118 is formed on the inner surface (the lower surface in FIG. 2) of the base material b, and the electrodes 114b are formed in stripes (refer to FIG. 1) on the colored layer 118 so as to be orthogonal to the electrodes 114a, as viewed from the direction of the arrow E. Furthermore, an alignment film 116b is formed on the electrodes 114b.

The electrodes 114a and 114b comprise, for example, a transparent conductive material ITO. The alignment films 116a and 116b are formed by depositing a polyimide resin or the like in a film having a uniform thickness. The alignment films 116a and 116b are rubbed to determine the initial orientation of the liquid crystal material L on the surfaces of the substrates 107a and 107b.

The sealing material 108 for bonding together the substrates 107a and 107b is formed by depositing an epoxy resin in a ring shape on the inner surface of the substrate 107a or 107b, for example, by screen printing. The sealing material 108 contains conductors 109 dispersed therein comprising spherical or cylindrical conductive materials, as shown in FIG. 2.

As shown in FIG. 2, the liquid crystal material L, for example, a STN (Super Twisted Nematic) liquid crystal, is sealed in the gap, i.e., the cell gap, surrounded by the substrates 107a and 107b and the sealing material 108. Furthermore, many small spherical spacers 119 are dispersed on the inner surface of the substrate 107a or 107b so that the thickness of the cell gap is maintained uniform by the spacers 119 present in the cell gap.

Furthermore, a polarizing plate 117a is mounted on the outer surface (the lower surface in FIG. 2) of the base material 111a.

Furthermore, a polarizing plate 117b is mounted on the outer surface (the upper surface in FIG. 2) of the base material 111b.

The electrodes 114a and 114b are arranged perpendicularly to each other, and the intersections of the electrodes define the dots in a dot matrix, as viewed from the direction of the arrow E in FIG. 2. Each of the intersections of the electrodes corresponds one dot. In the electro-optical device 101, the colors of red (R), green (G) and blue (B) of each of the colored layer 118 and the colored layer 121 are arrayed in a predetermined pattern, for example, a stripe pattern, a delta pattern, a mosaic pattern, or the like, as viewed from the direction of the arrow E. Each of the dots corresponds to any one of the colors of red (R), green (G) and blue (B), and three dots respectively corresponding to the three colors of red (R), green (G) and blue (B) are combined into a unit to form one pixel.

Light is selectively reflected from or transmitted through a plurality of pixels arrayed in the dot matrix to display an image of a character, a numeral, or the like on the outside of the substrate 107b constituting the liquid crystal panel 102. The region where an image is displayed as described above is an effective pixel region which is a planar rectangular region shown by arrow V in FIGS. 1 and 2.

As shown in FIG. 1, the substrate 107a has a wider area than the substrate 107b, and thus has a projecting portion 107c projecting outward beyond the substrate 107b when both substrates are bonded together with the sealing material 108. Also, various types of wirings such as lead wiring 114c extending from the electrodes 114a, lead wiring 114d electrically connected to the electrodes 114b on the substrate 107b through the conductor 109 (refer to FIG. 2) present in the sealing material 108, wiring 114e connected to input bumps, i.e., input terminals, of the liquid crystal driving IC 103a, wiring 114f connected to input bumps of the liquid crystal driving IC 103b, etc. are formed in a proper pattern in the projecting portion 107c.

The lead wiring 114c extending from the electrodes 114a and the lead wiring 114d electrically connected to the electrodes 114b are formed by using the same material as the electrodes, i.e., a conductive oxide such as ITO or the like.

The liquid crystal driving IC 103a and the liquid crystal driving IC 103b are mounted by being bonded to the surface of the projecting portion 107c with an anisotropic conductive film (ACF) 122. Namely, in this embodiment, a so-called COG (Chip On Glass) system liquid crystal panel having a structure in which semiconductor chips are mounted directly on a substrate is formed. In this COG-system mounted structure, the wirings 114e and 114f are conductively connected to the input bumps of the liquid crystal driving ICs 103a and 103b, and the lead wirings 114c and 114d are conductively connected to the output bumps of the liquid crystal driving ICs 103a and 103b, through conductive particles contained in the anisotropic conductive film 122.

As shown in FIG. 1, the flexible printed circuit board (FPC) 104 comprises a flexible resin film 123, a circuit 126 comprising chip parts 124, and metal wiring terminals 127. The circuit 126 is mounted directly on the surface of the flexible resin film 123 by conductive connection means such as soldering or the like. The metal wiring terminals 127 are made of a conductive material such as an Ag alloy, Cr, Cu, or the like. The portion of the flexible printed circuit board (FPC) 104, in which the metal wiring terminals 127 are formed, is connected to the portion of the first substrate 107a, in which the wirings 114e and 114f are formed, through the anisotropic conductive film 122. Therefore, the wirings 114e and 114f on the substrate side are conductively connected to the metal wiring terminals 127 on the FPC side by the action of the conductive particles contained in the anisotropic conductive film 122.

Also, external connection terminals 131 are formed at the edge of the flexible printed circuit board (FPC) 104 opposite to the display panel side, and the external connection terminals 131 are connected to an external circuit not shown in the drawing. The liquid crystal driving ICs 103a and 103b are driven based on a signal transmitted from the external circuit to supply a scanning signal to either the electrodes 114a or the electrodes 114b, and supply a data signal to the other electrodes. As a result, the voltage of each of the pixels arranged in a dot matrix in the effective display region V is controlled to control the orientation of the liquid crystal material L for each of the dots.

As shown in FIG. 2, the light source 106 functioning as a so-called back light shown in FIG. 1 comprises a light guide 132 comprising an acryl resin or the like, a diffusing sheet 133 provided on the light emission plane 132b of the light guide 132, a light-reflecting sheet 134 provided on the plane of the light guide 132 opposite to the light emission plane 132b, and LED 136 (Light Emitting Diode) as a light emission source.

The LED 136 is supported by a LED substrate 137 which is mounted on a support portion (not shown) formed integrally with the light guide 132. The LED substrate 137 is mounted at a predetermined position of the support portion so that the LED 136 is positioned to face the light receiving plane 132a at the end surface of the light guide 132. Reference numeral 138 denotes a buffer material for buffering a shock applied to the liquid crystal panel 102.

When the LED 136 emits light, the light is incident on the light receiving plane 132a, introduced into the light guide 132, transmitted while being reflected by the light-reflecting sheet 134 and the walls of the light guide 132, and emitted as flat light from the light emission plane 132b to the outside through the diffusing sheet 133.

In the electro-optical device 101 of the present invention having the above construction, when external light such as sunlight, room light or the like is sufficiently bright, as shown in FIGS. 2 and 3, external light is introduced into the liquid crystal panel 102 from the substrate 107b side, transmitted through the colored layer 118 and the liquid crystal material L, reflected by the transflective film 112, again supplied to the liquid crystal material L and then transmitted through the colored layer 118. The orientation of the liquid crystal material L is controlled for each pixel of red (R), green (G) and blue (B) by the electrodes 114a and 114b holding the liquid crystal material L therebetween, thereby modulating the light supplied to the liquid crystal material L for each of the dots. As a result, the light is divided into light transmitted through the polarizing plate 117b and light not transmitted therethrough by modulation to display an image of a character, a numeral, or the like on the outside of the liquid crystal panel 102. This is a reflective image display.

On the other hand, when a sufficient amount of external light cannot be obtained, light emitted from the LED 136 is emitted as flat light from the light emission plane 132b of the light guide 132, transmitted through the light-transmitting regions 113 formed in the transflective film 112 and the colored layer 121 formed to cover the light-transmitting regions 113, and then supplied to the liquid crystal material L. In this case, like in a reflective display, the supplied light is modulated for each of the dots by the liquid crystal material L having controlled orientation, and transmitted through the colored layer 118 to display an image on the outside. This is a transmissive image display.

In this way, in the electro-optical device 101 of the present invention, light is transmitted through not only the colored layer 121 but also the colored layer 118 in a transmissive display while maintaining the brightness of a reflective image display. Namely, light is transmitted through the colored layers one time each, i.e., a total of two times. Therefore, in the device, the color density and color purity of a transmissive image display can be improved without deteriorating the brightness of a reflective image display as a whole.

In the electro-optical device shown in FIG. 5, in a reflective display, external light is transmitted through the liquid crystal material L from the substrate 107b, transmitted through the colored layer 118, reflected by the transflective film 112, again transmitted through the colored layer 118, and then supplied to the liquid crystal material L to perform a reflective image display. In a transmissive display, light emitted from the LED 136 is transmitted through the colored layer 118, supplied to the liquid crystal material L, and transmitted through the colored layer 121 to perform a transmissive image display. In this case, light is transmitted through not only the colored layer 121 but also the colored layer 118 in a transmissive display while maintaining the brightness of a reflective image display. Namely, light is transmitted through the colored layers one time each, i.e., a total of two times, and thus in the device, the color density and color purity of a transmissive image display can be improved without deteriorating the brightness of a reflective image display as a whole.

Although, in above embodiments, a passive matrix electro-optical device is mainly described, the present invention, of course, can also be applied to an active matrix electro-optical device in which a switching element of TFT (thin film transistor) or TFD (thin film diode) is provided for each dot.

A method of manufacturing an electro-optical device according to an embodiment of the present invention is described in detail below with reference to FIG. 7.

The method of manufacturing the electro-optical device according to this embodiment of the present invention comprises forming the transflective film 112 on the inner surface of the plate-shaped substrate 107a made of transparent glass or plastic, as shown in FIG. 7(a) (Step P1: the step of forming the transflective film). In this case, for the transflective film 112, aluminum, silver, an alloy containing at least one of aluminum and silver, laminated films of aluminum or silver and titanium, titanium nitride, molybdenum, tantalum, or the like can be used. As a forming method, any of the above materials is uniformly deposited to a uniform thickness of about 0.1 to 0.3 $\mu$m by any desired deposition method (for example, a sputtering method, a vapor deposition method).

Next, as shown in FIG. 7(b), the light-transmitting regions 113 are formed at predetermined positions of the transflective film 112, for transmitting light emitted from the light source disposed at the back of the substrate 107a (Step P2: the step of forming the light-transmitting regions). As a forming method, a pattern having the predetermined light-transmitting regions 113 is formed by an appropriate patterning method (for example, a photolithography method and an etching method).

Next, as shown in FIG. 7(c), the colored layer 121 comprising a plurality of colored layers 121R, 121G and 121B having different colors is formed to cover the regions corresponding to the light-transmitting regions 113 of the transflective film 112 on the substrate 107a (Step P3: the step of forming the colored layer 121). More specifically, the colored layer 121 is formed in a lattice pattern having a predetermined thickness, as viewed from the direction of arrow A, by using resin materials (for example, a photosensitive resin such as an acryl resin or the like) of predetermined colors (in this case, red (R), green (G) and blue (B)), and a predetermined deposition method (for example, an ink jet method or a spin coating method) and a predetermined patterning method (for example, a photolithography method). In this embodiment, the area of the colored layer 121 is 100% of the area of the light-transmitting regions 113 of the transflective film 112.

Next, as shown in FIG. 7(d), the colored layer 118 comprising a plurality of colored layers 118R, 118G and 118B having different colors is formed on the substrate 107b in correspondence to the colored layer 121, the substrate 107b being opposed to the substrate 107a (Step P4: the step of forming the colored layer 118). In this case, materials having the same colors as the corresponding colored layers 121R, 121G and 121B are used for forming the colored layer 118. As the coloring material, for example, a photosensitive resin such as an acryl resin or the like can be used. The colored layer 118 can be formed by using a predetermined deposition method (for example, an ink jet method or a spin coating method), and a predetermined patterning method (for example, a photolithography method).

In this case, the colored layer 118 is preferably formed in the regions corresponding to the light-transmitting regions 113 of the transflective film 112 so that the area of the colored layer 118 is not less than 25% or not more than 150% of the area of the light-transmitting regions 113 of the transflective film 112.

Figure 7:
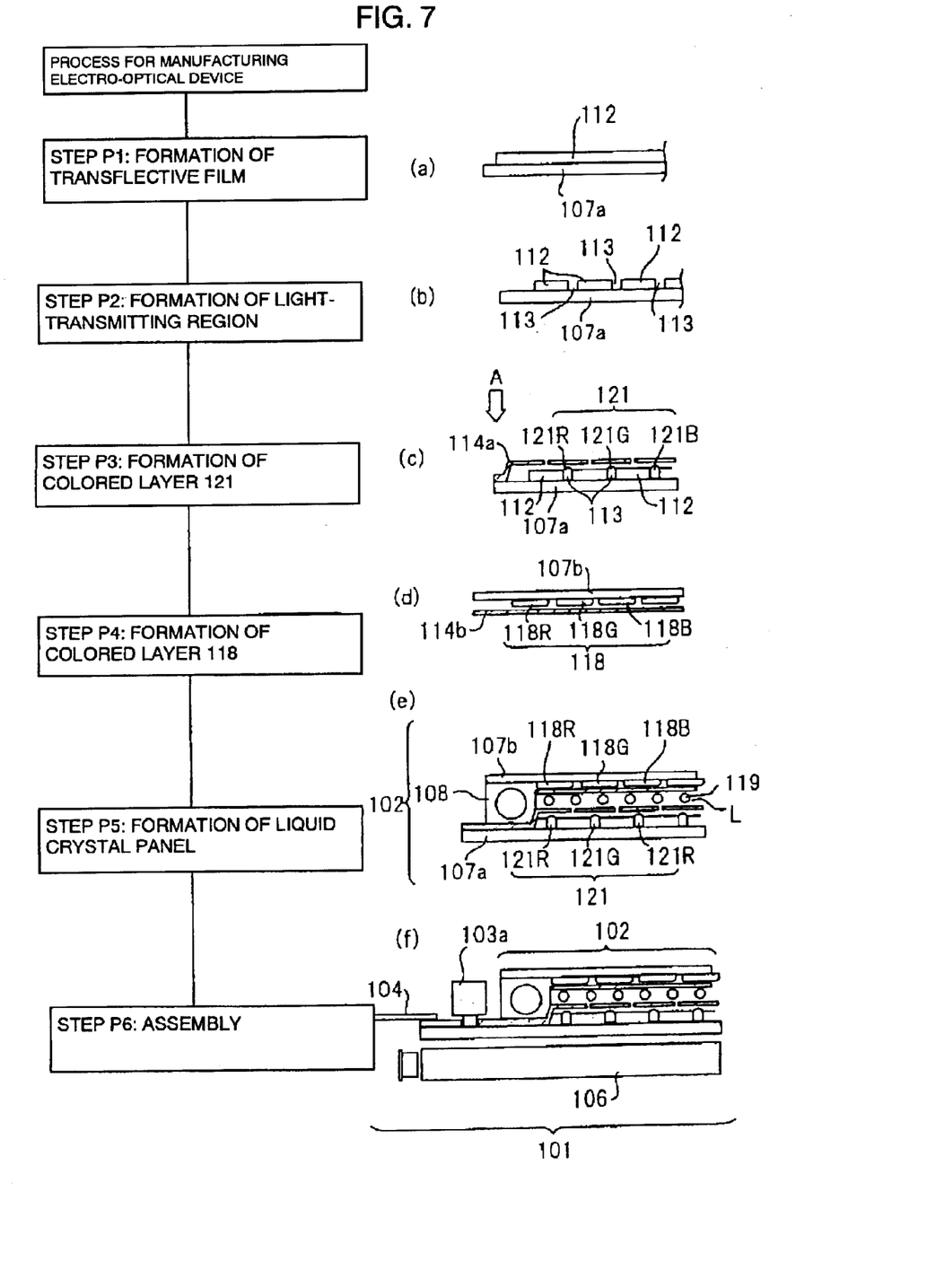
FIG. 7 is a sectional view schematically showing the manufacturing steps of a method of manufacturing an electro-optical device according to an embodiment of the present invention.

Although, in FIG. 7, red (R), green (G) and blue (B) are shown as examples of the colors of the colored layer 118 and the colored layer 121, the colors are not limited thereto, and a combination of cyan, magenta, and yellow may be used.

As the array pattern of the colored layer 118 and the colored layer 121, for example, patterns such a stripe pattern, a delta pattern, and a mosaic pattern as shown in FIG. 4 can be used.

In order to form the colored layer 118 and the colored layer 121 of red (R), green (G) and blue (B) by the ink jet method in step P3 and step P4, an ink jet head is moved to scan the surface of each of the substrate 107a and the substrate 107b while discharging ink droplets of a color dot material from a nozzle provided on the ink jet head with predetermined timing corresponding to the array pattern, depositing the material on each of the substrates 107a and 107b. The colored layer material is dried and solidified by thermal treatment, ultraviolet irradiation or vacuum drying to form each of the colored layer 118 and the colored layer 121. This process is repeated for each color of the dots of the colored layer 118 and the colored layer 121 to form the patterns of the colored layer 118 and the colored layer 121 which are capable of realizing a full-color image display having a desired color tone without variations (unevenness).

In the use of the ink jet method, scanning of the ink jet head may be repeated for each of the colors of the colored layer 118 and the colored layer 121 to form the colored layer 118 and the colored layer 121, or the ink jet head may comprise nozzles for the respective three colors, red (R), green (G) and blue (B), so that the three colors of red (R), green (G) and blue (B) are simultaneously formed by one scan.

Examples of the ink jet method include a piezo-element method, a method using heat energy, and the like. However, 50 pl or less of a fluid is preferably discharged with discharge precision of ±30 μm or less.

Next, as shown in FIG. 7(e), the substrates 107a and 107b are bonded together with the sealing material 108, and the liquid crystal material L as an electro-optical material is injected and sealed between a pair of the substrates to form the liquid crystal panel 102 (Step P5: the step of forming the liquid crystal panel).

First, the alignment film is applied on each of the substrates 107a and 107b, and then rubbed. Rubbing is a step of rubbing the surface of the alignment film with a cotton cloth or the like in a direction to form micro grooves. This can control the orientation direction of the liquid crystal material L sealed in the electro-optical device. As the material of the alignment film, a polyimide resin or the like can be used. Next, the sealing material 108 for bonding the substrates 107a and 107b together constituting the electro-optical device is printed, and the substrates 107a and 107b are bonded together with the sealing material 108. At the same time, the liquid crystal material L is filled in the gap between the substrates 107a and 107b and then sealed to form the liquid crystal panel 102. As the liquid crystal material L used in the electro-optical device of the present invention, for example, a STN (Super Twisted Nematic) liquid crystal or a TN (Twisted Nematic) liquid crystal may be used. The many fine spherical spacers 119 are dispersed on the inner surfaces of the substrate 107a and 107b, and thus the thickness of the cell gap is maintained uniform by the spacers 119 present in the cell gap.

As shown in FIG. 6(a), the substrates 107a and 107b of the electro-optical device of the present invention can be formed on a large-area mother base material 150. More specifically, a pattern for one substrate 107a or 107b is formed on the surface of each of a plurality of substrate formation regions 151 set in the mother base material 150. Then, cutting grooves are formed around each of the substrate formation regions 151, and the mother base material 150 is cut along the grooves to form the substrates 107a and 107b. Cutting may be performed after common electrode substrates are bonded to form a pair of substrates.

Then, as shown in FIG. 7(f), the electro-optical device 101 is assembled (Step P6: the assembly step). The polarizing plates 117a and 117b are mounted on the surfaces of the liquid crystal panel 102, and then the liquid crystal driving IC 103a and the flexible printed circuit board (FPC) 104, etc. are connected to the liquid crystal panel 102. Furthermore, the light source 106 is disposed as the back light at the back of the liquid crystal panel 102.

The light source 106 functioning as the back light comprises a light guide comprising an acryl resin or the like, a diffusing sheet provided on the light emission plane of the light guide, a light-reflecting sheet provided on the plane of the light guide opposite to the emission plane, and LED (Light Emitting Diode) as a light emission source.

The LED is supported by a LED substrate which is mounted, for example, on a support portion formed integrally with the light guide. The LED substrate is mounted at a predetermined position of the support portion to dispose the LED at a position facing the light receiving plane at the side surface of the light guide.

In the electro-optical device manufactured by the above-descried manufacturing method having the above construction, the color density and color purity of a transmissive image display can be improved without deteriorating the brightness of a reflective image display.

Figure 8:
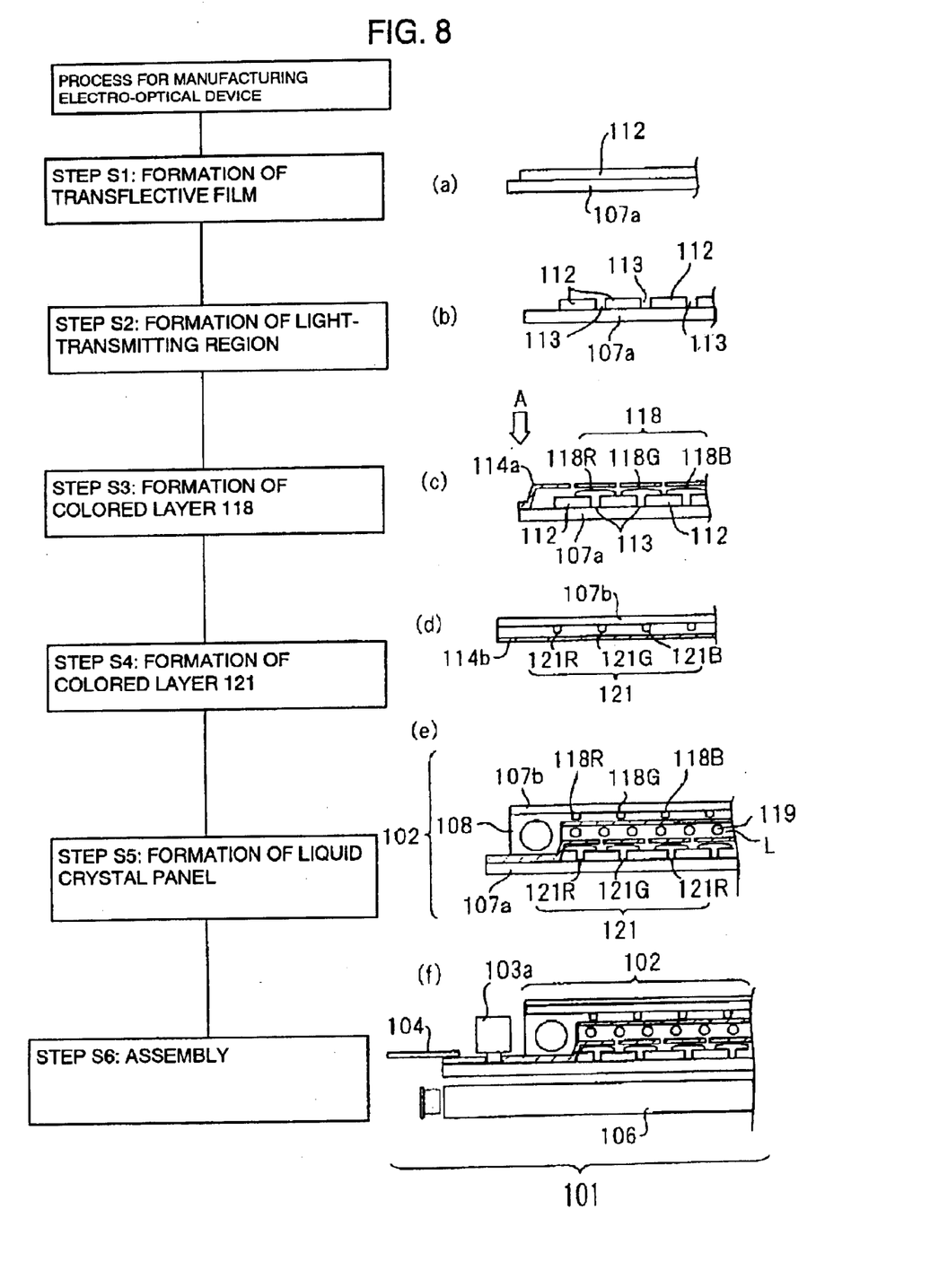
FIG. 8 is a sectional view schematically showing the manufacturing steps of a method of manufacturing an electro-optical device according to another embodiment of the present invention.

A method of manufacturing an electro-optical device according to another embodiment of the present invention is described in detail below with reference to FIG. 8.

In the method of manufacturing the electro-optical device according to this embodiment of the present invention, as shown in FIG. 8(a), the transflective film 112 is first formed on the inner surface of the plate-shaped substrate 107a made of transparent glass or plastic (Step S1: the step of forming the transflective film). In this case, for the transflective film 112, aluminum, silver, an alloy containing at least any of aluminum and silver, laminated films of aluminum or silver and titanium, titanium nitride, molybdenum, tantalum, or the like can be used. As a forming method, any of the above materials is uniformly deposited to a uniform thickness of about 0.1 to 0.3 μm by any desired deposition method (for example, a sputtering method).

Next, as shown in FIG. 8(b), the light-transmitting regions 113 are formed at predetermined positions of the transflective film 112, for transmitting light emitted from the light source disposed at the back of the substrate 107a (Step P2: the step of forming the light-transmitting regions). As a forming method, a pattern having the predetermined light-transmitting regions 113 is formed by an appropriate patterning method (for example, a photolithography method and an etching method).

Next, as shown in FIG. 8(c), the colored layer 118 comprising a plurality of colored layers 118R, 118G and 118B having different colors is formed to cover the entire regions of dots on the substrate 107a (Step S3: the step of forming the colored layer 118). More specifically, the colored layer 118 is formed in a lattice pattern having a predetermined thickness, as viewed from the direction of arrow A, by using resin materials (for example, a photosensitive resin such as an acryl resin or the like) of predetermined colors (in this case, red (R), green (G) and blue (B)), and a predetermined deposition method (for example, an ink jet method or a spin coating method) and a predetermined patterning method (for example, a photolithography method).

Next, as shown in FIG. 8(d), the colored layer 121 comprising a plurality of colored layers 121R, 121G and 121B having different colors is formed in regions of the substrate 107b in correspondence to the colored layer 118, the substrate 107b being opposed to the substrate 107a (Step P4: the step of forming the colored layer 121). In this case, materials having the same colors as the corresponding colored layers 118R, 118G and 118B are used for forming the colored layer 121. As the coloring material, for example, a photosensitive material such as an acryl resin or the like can be used. The colored layer 121 can be formed by using a predetermined deposition method (for example, an ink jet method or a spin coating method), and a predetermined patterning method (for example, a photolithography method).

In this case, the colored layer 121 is preferably formed in the regions corresponding to the light-transmitting regions 113 of the transflective film 112 so that the area of the colored layer 121 is 100% of the area of the light-transmitting regions 113 of the transflective film 112.

The subsequent steps S5 and S6 are the same as the above-described steps P5 and P6, respectively.

In the electro-optical device manufactured by the above-descried manufacturing method having the above construction, the color density and color purity of a transmissive image display can be improved without deteriorating the brightness of a reflective image display.

The transflective electro-optical device 101 having the above construction can be used as a display section of any of various electronic apparatuses. Examples of the electronic apparatuses are described in detail below with reference to FIGS. 9 to 11.

Figure 9:
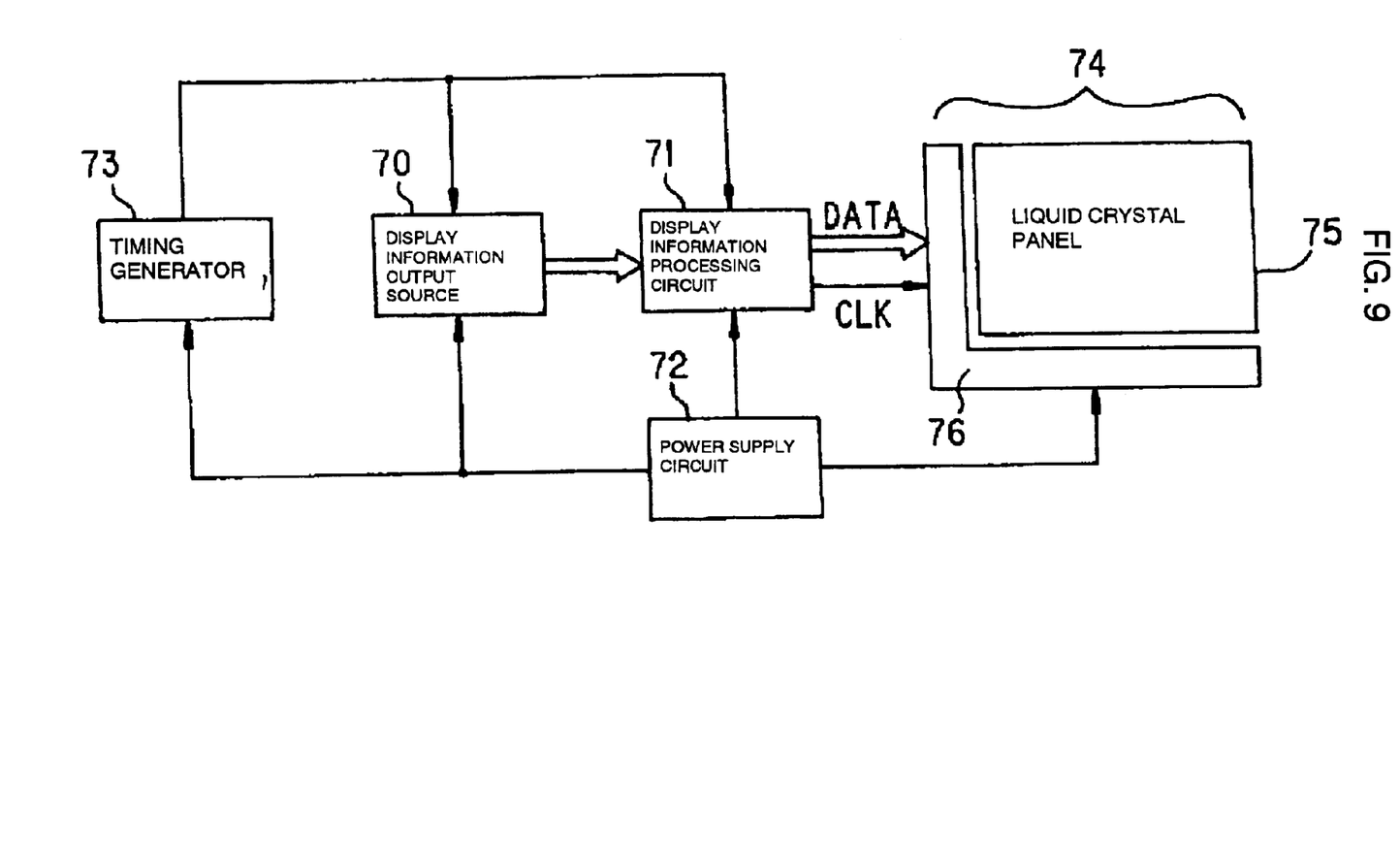
FIG. 9 is a block diagram showing the circuit configuration of an electronic apparatus using an electro-optical device of the present invention as a display device.

FIG. 9 is a block diagram showing the circuit configuration of an electronic apparatus using the electro-optical device of the present invention as a display device.

In FIG. 9, the electronic apparatus comprises a display information output source 70, a display information processing circuit 71, a power supply circuit 72, a timing generator 73, and a liquid crystal device 74. The liquid crystal device 74 comprises a liquid crystal panel 75 and a driving circuit 76. The liquid crystal device 101 can be used as the liquid crystal device 74.

The display information output source 70 comprises a memory such as ROM (Read Only Memory), RAM (Random Access memory) or the like, a storage unit such as any of various disks, and a tuning circuit for tuning and outputting a digital image signal, and supplies display information such as an image display signal in a predetermined format, etc. to the display information processing circuit 71 based on various clock signals generated by the timing generator 73.

The display information processing circuit 71 comprises various known circuits such as a serial-parallel converting circuit, an amplifying-inverting circuit, a rotation circuit, a gamma-correction circuit, a clamp circuit, etc, and performs processing of input display information to supply the image signal to the driving circuit 76 together with a clock signal CLK. The power supply circuit 72 supplies a predetermined voltage to each of the components.

Figure 10:
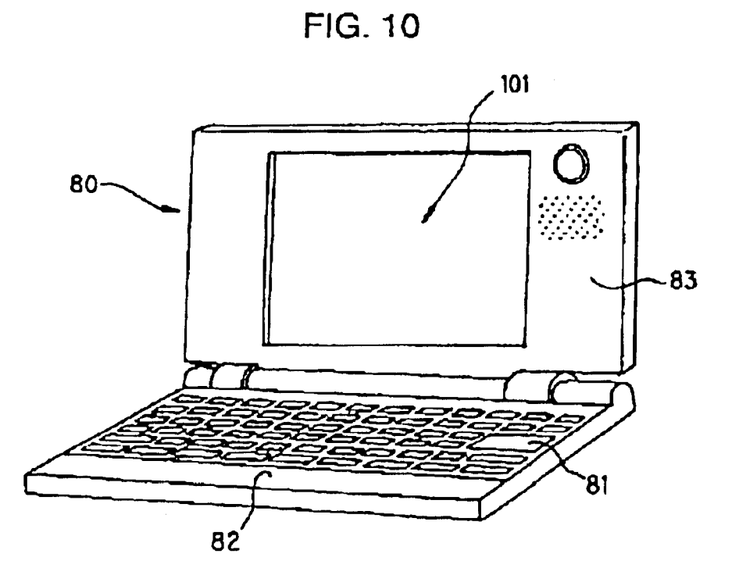
FIG. 10 is a drawing illustrating a mobile personal computer as an example of electronic apparatuses using an electro-optical device of the present invention.

FIG. 10 shows a mobile personal computer as an electronic apparatus according to an embodiment of the present invention. The personal computer 80 shown in FIG. 10 comprises a body section 82 comprising a keyboard 81, and a liquid crystal display unit 83. The liquid crystal display unit 83 comprises the electro-optical device 101.

Figure 11:
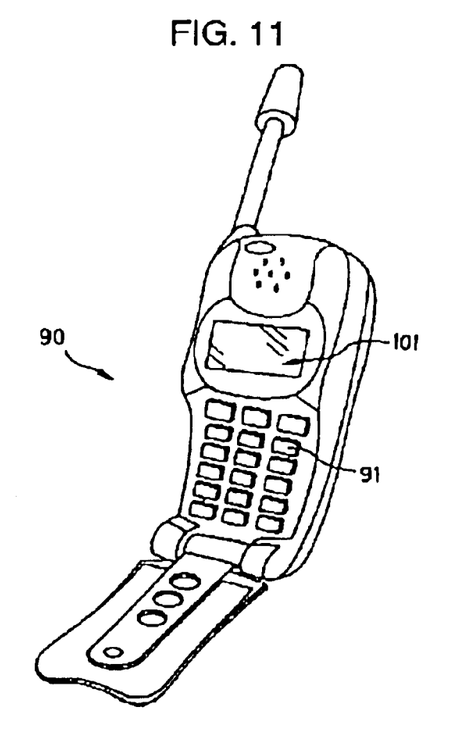
FIG. 11 is a drawing illustrating a cellular phone as another example of electronic apparatuses using an electro-optical device of the present invention.

FIG. 11 shows a cellular phone as another example of the electronic apparatus. The cellular phone 90 shown in FIG. 11 comprises a plurality of operating buttons 91, and a display section comprising the electro-optical device 101.

As described above, the present invention can provide an electro-optical device suitably used as a transflective electro-optical device of an electronic apparatus such as a cellular phone, a portable personal computer, or the like, and capable of improving the color density and color purity of a transmissive image display without deteriorating the brightness of a reflective image display. The present invention can also provide a method of manufacturing the electro-optical device, and an electronic apparatus.

The entire disclosure of Japanese patent application No. 2001-342451 filed Nov. 7, 2001 is hereby incorporated by reference.

What is claimed is:

1. An electro-optical device provided with an electro-optical panel in which an electro-optic material is held between a pair of electrodes, and a dot is formed in each of regions where the pair of electrodes opposes each other, and provided with a light source for irradiating the electro-optic panel with light, the device being capable of operating as a reflective display using external light and a transmissive display using light from the light source, the device comprising:

a transflective film having a light-transmitting region provided for each of the dots to transmit light from the light source, and a light-reflecting region for reflecting the external light;

a first colored layer provided corresponding to the dots; and a second colored layer provided opposite to the first colored layer with the electro-optical material held therebetween, the second colored layer positioned in the light transmitting regions of the transflective film.

2. The electro-optical device according to claim 1, wherein the first colored layer and second colored layer comprise substantially the same material.

3. (original) The electro-optical device according to claim 1, further comprising:

a pixel defined by the plurality of dots, wherein the first colored layer and second colored layers have aligned segments of the same color, adjacent segments being of different colors so that each pixel is comprised of dots of different color.

4. An electro-optical device provided with an electro-optical panel in which an electro-optical material is held between a pair of opposed electrodes, and a dot is formed in each of regions where the pair of opposed electrodes opposes each other, and provided with a light source for irradiating the electro-optical panel with light, the device being capable of operating as a reflective display using external light and a transmissive display using light from the light source, the device comprising:

a transflective film provided on one of the pair of electrodes and having a light-transmitting region provided for each of the dots to transmit light from the light source and a light-reflecting region for reflecting the external light;

a first colored layer provided corresponding to the dots; and a second colored layer provided in the light transmitting regions of the transflective film.

5. The electro-optical device of claim 1 which is configured as a display for electronic apparatus.

6. A method of manufacturing an electro-optical device provided with an electro-optical panel in which an electro-optical material is held between a pair of electrodes, and a dot is formed in each of regions where the pair of electrodes opposes each other, and provided with a light source for irradiating the electro-optical panel with light, the device being capable of operating as a reflective display using external light and a transmissive display using light from the light source, the method comprising the steps of:

forming a transflective film comprising a light-transmitting region for transmitting light from the light source and a light-reflecting region for reflecting the external light in such a manner that the light-transmitting region corresponds to each of the dots;

forming a first colored layer corresponding to the dots; and forming a second colored layer opposite to the first colored layer with the electro-optical material held therebetween, the second colored layer positioned in the light transmitting regions of the transflective film.

7. An electro-optical device comprising:

an electro-optical panel having layer of an electro-optical material;

a first set of electrodes on one side of the electro-optical material;

a second set of electrodes on an opposite side of the electro-optical material;

a matrix of dot regions defined by intersections of the first and second set of electrodes;

a light source for irradiating the electro-optical panel with light;

a transflective film having an array of light transmitting regions corresponding to the dot matrix, the transflective film having adjacent light-reflecting regions for reflecting the external light;

a first colored layer having an array of colored segments, one segment for each of the dots;

a second colored layer having an array of colored segments, one segment in each of the light-transmitting regions in the transflective film;

the electro-optical material being sandwiched between the first and second colored layers;

the segments of the first colored layer being vertically aligned with the segments of the second colored layer;

vertically aligned segments of the layers being of the same color, while horizontally adjacent segments in each layer are different colors; groups of vertically aligned segments generally defining pixels for the display; and the device being capable of operating as a reflective mode display using external light and a transmissive mode display using light from the light source, light from the light source passing through the same colored segments in the first and second colored layers when the display is operating in the transmissive mode.

8. The device of claim 7 wherein there are blue, green and red segments in each group.

9. The device of claim 7 wherein the segments in the first layer cover at least 80% of the dot area, and the segments of the second colored layer cover at least 25% of the area of the light-transmitting regions.

10. An electro-optical device comprising:

a first substrate;

a second substrate positioned opposite the first substrate;

an electro-optical material disposed between said first substrate and said second substrate;

a first set of electrodes on a first side of said electro-optical material;

a second set of electrodes on a second side of said electro-optical material;

a transflective film having at least one light reflecting region and at least one light transmitting region;

a matrix of dot regions located where said first electrodes cross said second electrodes;

a first colored layer having an array of colored segments, said segments positioned at said dots; and a second colored layer having an array of colored segments, said colored segments positioned at said light transmitting regions of said transflective film.

11. An electro-optical device comprising:

a first substrate;

a second substrate positioned opposite the first substrate;

an electro-optical material disposed between said first substrate and said second substrate;

a first set of electrodes on a first side of said electro-optical material;

a second set of electrodes on a second side of said electro-optical material;

a transflective film formed on said first substrate having at least one light-reflecting region and at least one light-transmitting region;

a matrix of dot regions located where said first electrodes cross said second electrodes;

a first colored layer having an array of colored segments, said colored segments positioned at said light-transmitting regions of said transflective film; and a second colored layer formed on said second substrate in correspondence to said light transmitting-regions of said transflective film.

12. An electro-optical device comprising:

a first substrate;

a second substrate positioned opposite the first substrate;

an electro-optical material disposed between said first substrate and said second substrate;

a first set of electrodes on a first side of said electro-optical material;

a second set of electrodes on a second side of said electro-optical material;

a transflective film having at least one light-reflecting region and at least one light-transmitting region comprising at least one aperture;

a matrix of dot regions located where said first electrodes cross said second electrodes;

a first colored layer having an array of colored segments, said segments positioned at said dots; and a second colored layer having an array of colored segments, said colored segments positioned at said light-transmitting regions of said transflective film;

wherein said second colored layer is provided in said apertures of said transflective flim.

* * * * *